(12) United States Patent
Fusalba et al.

(10) Patent No.: US 8,525,020 B2
(45) Date of Patent: Sep. 3, 2013

(54) PHOTOVOLTAIC CELL WITH NON-MISCIBLE ELECTROLYTES

(75) Inventors: Florence Fusalba, Grenoble (FR); Bruno Remiat, Grenoble (FR)

(73) Assignee: Commissariat a l'Energie Atomique, Paris (FR)

( * ) Notice: Subject to any disclaimer, the term of this patent is extended or adjusted under 35 U.S.C. 154(b) by 1187 days.

(21) Appl. No.: 12/186,807

(22) Filed: Aug. 6, 2008

(65) Prior Publication Data

US 2009/0050197 A1    Feb. 26, 2009

(30) Foreign Application Priority Data

Aug. 23, 2007  (FR) ...................................... 07 57139

(51) Int. Cl.
*H01L 31/0203*    (2006.01)
*H01L 31/048*    (2006.01)

(52) U.S. Cl.
USPC ........... 136/259; 136/252; 136/263; 136/251; 438/64

(58) Field of Classification Search
USPC .................... 136/259, 252, 263, 251; 438/64
See application file for complete search history.

(56) References Cited

U.S. PATENT DOCUMENTS

| 6,657,119 | B2* | 12/2003 | Lindquist et al. | 136/251 |
| 2001/0004901 | A1* | 6/2001 | Yamanaka et al. | 136/263 |
| 2002/0040728 | A1* | 4/2002 | Yoshikawa | 136/263 |
| 2005/0072458 | A1* | 4/2005 | Goldstein | 136/251 |
| 2009/0000661 | A1* | 1/2009 | Yoshimoto et al. | 136/256 |

FOREIGN PATENT DOCUMENTS

| LV | 12930 | 1/2003 |
| WO | WO 99/18456 | 4/1999 |
| WO | WO 00/58763 | 10/2000 |

OTHER PUBLICATIONS

N. A. Kotov, et al., "A Photoelectrochemical Effect at the Interface of Immiscible Electrolyte Solutions", Journal of Electro-analytical Chemistry and Interfacial Electrochemistry, vol. 285, No. 1-2, XP 002473813, Jun. 11, 1990, pp. 223-240.

Z Samec, et al., "A Generalised Model for Dynamic Photocurrent Responses at Dye-Sensitised Liquid|Liquid Interfaces", Journal of Electro-analytical Chemistry and Interfacial Electrochemistry, vol. 577, No. 2, XP 004786539, 2005, pp. 323-337.

Evan Franklin, et al., "Towards a Simplified 20% Efficient Sliver Cell", IEEE $4^{th}$ World Conference on Photovoltaic Energy Conversion, XP 002473814, May 2006, 4 Pages.

(Continued)

*Primary Examiner* — Jennifer Michener
*Assistant Examiner* — Golam Mowla
(74) *Attorney, Agent, or Firm* — Oblon, Spivak, McClelland, Maier & Neustadt, L.L.P.

(57) ABSTRACT

A photovoltaic cell including at least: a closed chamber including two end walls arranged opposite one another, with at least one being intended to receive incident light radiation, and including at least one side wall formed by at least one stack of a first electrode and a second electrode electrically insulated from one another, the first electrode and second electrode each having an annular shape each being disposed at a periphery of a respective one of the two end walls; at least two non-miscible electrolytes placed in the closed chamber, forming two superimposed layers of which one is in contact with the first electrode and the other is in contact with the second electrode; and a photoactive layer, placed in the closed chamber, that achieves a photovoltaic conversion of energy of the incident light radiation.

17 Claims, 1 Drawing Sheet

(56) References Cited

OTHER PUBLICATIONS

B. Berge, et al., "Variable Focal Lens Controlled by an External Voltage: An Application of Electrowetting", European Physical Journal E 3, 2000, pp. 159-163.

David J. Fermín, et al., "Photocurrent Responses Associated with Heterogeneous Electron Transfer at Liquid/Liquid Interfaces", Chem. Commun., 1998, pp. 1125-1126.

P. Wang, et al., "Novel Room Temperature Ionic Liquids of Hexaalkyl Substituted Guanidinium Salts for Dye-Sensitized Solar Cells", Applied Physics A 79, 2004, pp. 73-77.

P. Weng, et al., "A New Ionic Liquid Electrolyte Enhances the Conversion Efficiency of Dye-Sensitized Solar Cells", J. Phys. Chem. B, 107, 2003, pp. 13280-13285.

Marisa C. Buzzeo, et al., "Non-Haloaluminate Room-Temperature Ionic Liquids in Electrochemistry—A Review", Chem. Phys. Chem. 5, 2004, pp. 1106-1120.

\* cited by examiner

PHOTOVOLTAIC CELL WITH NON-MISCIBLE ELECTROLYTES

TECHNICAL FIELD

The invention relates to the field of photovoltaic cells, and more specifically that of small photovoltaic cells intended for applications requiring low energy, for example on-board nomadic devices (portable telephones, multimedia reader, etc . . . ).

PRIOR ART

It is known to produce a photovoltaic cell comprising a first electrode stacked with a first layer based on a semiconductor of type N, for example silicon, a second layer based on a semiconductor of type P and a second electrode, thus forming a PN junction arranged between two electrodes. The electrodes make it possible to collect the current created by the PN junction by receiving photons of incident light.

Gratzel cells are organic photovoltaic cells. They are nanocrystalline photovoltaic cells comprising titanium dioxide electron acceptor particles coated with a photosensitive dye, called a "sensitizer", in the form of a monomolecular layer. These particles are placed in an electrolytic solution, or solvent liquid, acting as hole transporter. When a light ray reaches the dye of a titanium dioxide particle, an electron is ejected by said particle. All of the electrons thus released pass through the oxide and, owing to the percolation of the titanium dioxide particles, are collected at the edge of the cell by contacts at the front and rear face, and are then directed toward an external circuit. In an alternative, the electrolytic solution can be replaced by a solid polymer.

Such cells in particular have the disadvantages of relatively low efficiency (on the order of 4%) when they are based on a solid polymer, and have a certain instability when the titanium dioxide particles are placed in an electrolytic solution, due to the breakdown and evaporation of the organic solution. Finally, such a cell has the disadvantages of comprising only a single transparent face for collecting light, and the electrode located at the level of this transparent face is based on a material that is generally expensive and/or has a low electrical conductivity.

DESCRIPTION OF THE INVENTION

Thus there is a need to provide a new photovoltaic cell structure providing greater transparency, a robust design, and with a low production cost.

To do this, an embodiment proposes a photovoltaic cell comprising at least:
- a closed chamber including two end walls arranged opposite one another, with at least one being intended to receive incident light radiation, and including at least one side wall formed by at least one stack of a first electrode and a second electrode electrically insulated from one another;
- at least two non-miscible electrolytes placed in the closed chamber, forming two superimposed layers of which one is in contact with the first electrode and the other is in contact with the second electrode;
- means, placed in the closed chamber, capable of achieving a photovoltaic conversion of the energy of the light radiation received.

By electrolyte, here and throughout the remainder of the document, we mean an ionic conductive medium. Electrolytes may in particular be electrolytic solutions.

According to one embodiment, contrary to the known devices, charges are collected laterally to the incident radiation by electrodes forming the side wall of the chamber.

The cell according to the embodiment also provides greater integration flexibility because it overcomes the problems of shading associated with metallizations, without requiring transparent conductors or fine metallizations. It is therefore possible to use non-transparent electrodes in order to form the side wall of the chamber, allowing the use of inexpensive conventional materials and providing better conductivity.

In addition, the structure of this photovoltaic cell offers greater robustness due to the absence of a mobile portion.

Finally, the structure of the photovoltaic cell according to the embodiment makes it possible to obtain a good collection of electric charges from the photocurrent generated.

The cell may have a substantially cylindrical, cubic or triangular shape or any other shape. The cell may have a prism shape.

The first electrode and/or the second electrode and/or the side wall of the chamber may have a substantially annular or polygonal shape.

The cell may also comprise a first substrate arranged against the first electrode and forming one of the two end walls of the chamber and/or a second substrate arranged on the second electrode forming the other of the two end walls of the chamber.

The first substrate and/or the second substrate may be based on glass and/or polymer.

One of the two electrolytes may be aqueous and the other of the two electrolytes may be organic.

One of the two electrolytes may be polar and the other of the two electrolytes may be apolar.

One of the two electrolytes may be hydrophobic and the other of the two electrolytes may be hydrophilic.

The insulation between the two electrodes may be produced by at least one dielectric material portion.

At least one of the two electrolytes may be based on an ionic liquid. The use of one or two ionic liquids in the photovoltaic cell makes it possible to increase the range of operating temperatures of the cell (for example, between around 0° C. and 200° C.).

The means capable of achieving the photovoltaic conversion may comprise at least electron acceptor or donor redox couples, and electron donor or acceptor photosensitive molecules respectively, in which the redox couples may be arranged in one of the two electrolytes, and the photosensitive molecules may be arranged in the other of the two electrolytes.

According to the photosensitive molecule used, it is possible to obtain a photovoltaic cell with a wide absorptions spectrum.

In an alternative, the means capable of achieving the photovoltaic conversion may comprise at least one photoactive layer deposited at the interface between the two electrolytes. This photoactive layer is capable of inducing a photocurrent when said layer receives the incident light radiation.

The photoactive layer may be obtained by electrolytic deposition.

The photoactive layer may comprise a heterojunction based on at least one polymer-type electron donor semiconductor and at least one electron acceptor semiconductor.

In an alternative, the photoactive layer may comprise a homojunction formed by at least two layers, based on at least one semiconductor, with a different doping.

The first electrode and/or the second electrode may be partially coated with at least one dielectric material.

The first electrode and/or the second electrode and/or the dielectric material portion and/or, when the cell comprises a first substrate and/or a second substrate, the first substrate and/or the second substrate may be based on at least one hydrophobic or hydrophilic material, or comprise a hydrophobic or hydrophilic surface treatment.

Another embodiment also relates to a method for producing a photovoltaic cell, comprising at least the following steps:

the production of a stack of a first electrode and a second electrode, electrically insulated from one another, forming at least one side wall of a chamber, on a first end wall of the chamber;

the production of a second end wall opposite the first end wall, closing the chamber, in which at least one of the two end walls is intended to receive light radiation;

the method also comprises a deposition of at least two non-miscible electrolytes in the chamber, forming two superimposed layers, of which one is in contact with the first electrode and the other is in contact with the second electrode, and a deposition, in the chamber, of means capable of achieving a photovoltaic conversion of the energy of the light radiation received.

The deposition of the two electrolytes may be performed by a step of injecting two electrolytes implemented after the step of producing the second end wall by means of a piercing created in the chamber after the step of producing the second end wall or a preliminary machining performed in one of the end walls.

In an alternative, the deposition of the two electrolytes may be performed between the step of producing the stack and the step of producing the second end wall. Thus, the electrolytes are deposited in the chamber before it is closed.

The means capable of achieving the photovoltaic conversion may comprise at least electron acceptor or donor redox couples and electron donor or acceptor photosensitive molecules respectively, in which the redox couples may be arranged in one of the two electrolytes, the photosensitive molecules may be arranged in the other of the two electrolytes, the deposition of the means capable of performing a photovoltaic conversion may be performed by the step of depositing the electrolytes in the chamber.

The means capable of achieving the photovoltaic conversion may comprise at least one photoactive layer deposited at the interface, for example, by electrolytic deposition, between the two electrolytes after the deposition of the two electrolytes in the chamber.

The stack of the first electrode and the second electrode may be produced on a first substrate forming the first end wall of the chamber.

The second end wall may be obtained by producing a second substrate on the second electrode.

The method may also comprise, during the step of producing the stack, a step of partial covering of the first electrode and/or the second electrode with at least one dielectric material.

Finally, the method may also comprise at least one step of hydrophobic or hydrophilic treatment of the materials of the first electrode and/or the second electrode and/or, when the cell comprises a first substrate and/or a second substrate, of the first substrate and/or the second substrate.

The first electrode and/or the second electrode may be arranged at the periphery of the first/second substrate.

BRIEF DESCRIPTION OF THE DRAWINGS

The present invention can be better understood on reading the following description of examples of embodiments provided purely for indicative and non-limiting purposes, in reference to the appended drawings in which.

Identical, similar or equivalent parts of the various figures described below have the same numeric references for the sake of consistency between the figures.

In order to make the figures easier to read, the various parts shown in the figures are not necessarily done so according to a uniform scale.

The various possibilities (alternatives and embodiments) should be understood as not being exclusive of one another and can be combined with one another.

DETAILED DESCRIPTION OF SPECIFIC EMBODIMENTS

Figure 1:
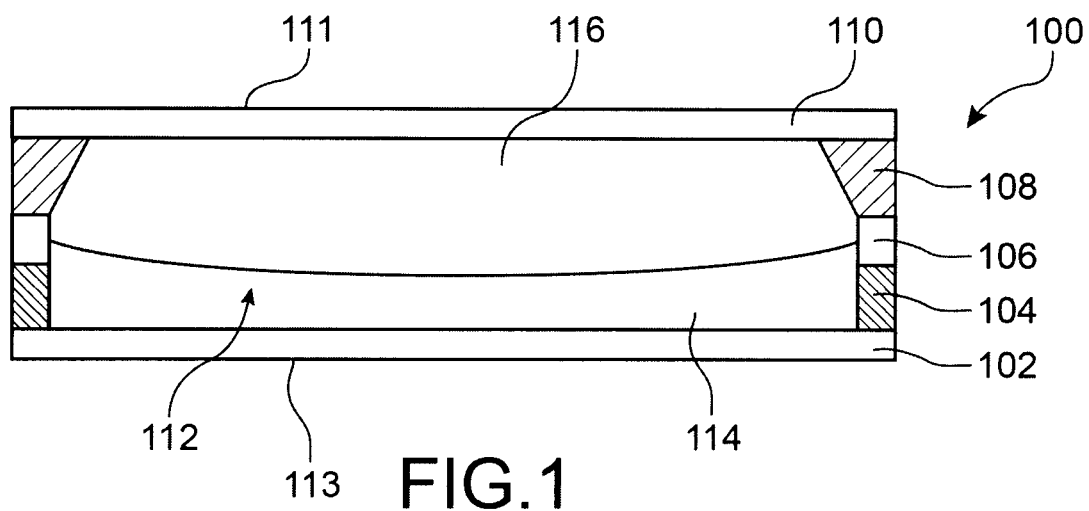
FIG. 1 is a cross-section view of a photovoltaic cell with non-miscible electrolytes according to a first embodiment.

Reference is first made to FIG. 1, which shows a cross-section view of a photovoltaic cell 100 with non-miscible electrolytes according to a first embodiment.

The photovoltaic cell 100, which in this case has a substantially cylindrical shape, comprises a first substrate 102, for example based on glass and/or polymer. In FIG. 1, the substrate 102 has a substantially cylindrical shape.

A first metal-based electrode 104 is arranged on the first substrate 102. This first electrode 104, for example based on silver and/or any other metal suitable for contact with an electrolyte, in this case has an annular shape and is arranged at the periphery of the first substrate 102. In addition, in this first embodiment, the first electrode 104 is continuous over the entire periphery of the first substrate 102, i.e. formed by a single portion of the metal material of said electrode 104.

In an alternative, the first electrode 104 may be non-continuous, i.e. formed by a plurality of portions of metal material distributed at the periphery of the first substrate 102 and electrically connected to one another. Portions of dielectric material are then arranged between the metal portions of said first electrode 104.

The photovoltaic cell 100 also comprises a dielectric portion 106 with a substantially annular shape, arranged on the first electrode 104, on which a second electrode 108 rests, also with a substantially annular shape and capable of being based on a material similar to that used to produce the first electrode 104. The dielectric portion 106 therefore makes it possible to electrically insulate the two electrodes 104, 108 from one another.

In this first embodiment, the first electrode 104 and the dielectric portion 106 each have a rectangular profile. In an alternative, it is possible for these profiles to have different shapes (trapezoid, triangle, etc.). In FIG. 1, the second electrode 108 has a trapezoidal profile, but in an alternative, the shape of this profile may be different.

The photovoltaic cell 100 finally comprises a second substrate 110, for example similar to the first substrate 102, arranged on the second electrode 108. Thus, a closed chamber 112 is produced in the cell 100, comprising a first end wall formed by the first substrate 102, a side wall formed by the first and second electrodes 104, 108 and the dielectric material 106, and a second end wall forming a lid obtained by the second substrate 110.

The first substrate 102 and/or the second substrate 110 can be transparent, depending on whether the photovoltaic cell 100 is illuminated on a single side or on two opposite sides formed by the two substrates 102, 110. In the example of FIG. 1, the cell 100 is illuminated on faces 111 and 113.

Two non-miscible electrolytes 114 and 116 are arranged in the chamber 112. These two electrolytes 114 and 116 can be obtained by dissolving or mixing a solute such as a salt, an acid or a base, in a polar or apolar solvent (water, organic solvent or ionic liquid).

In the first embodiment described here, a first of the two electrolytes 114 is an aqueous electrolytic solution and a second of the two electrolytes 116 is an organic electrolytic solution. These two electrolytes 114, 116 can be placed in the chamber 112 during its production, for example before the second substrate 110 has been placed on the second electrode 108 in order to close the chamber 112. They can also be placed in the chamber 112 after its production, i.e. after the chamber 112 has been closed by the second substrate 110, by injecting them into the chamber 112, for example with a syringe producing a piercing in the chamber 112 or by means of a preliminary machining produced in the first substrate 102 or the second substrate 110. In general, the photovoltaic cell 100 is produced by an assembly of the various elements forming it.

The aqueous electrolyte 114 is arranged at the base of the chamber 112, against the first transparent substrate 102, up to the level of the dielectric annular portion 106. Thus, the dielectric material portion 106 enables the aqueous electrolyte 114 to be in contact only with a single electrode 104, and thus not to bypass the second electrode 108. The organic electrolyte 116 is deposited on the aqueous electrolyte 114, thus filling the chamber 112. Since the two electrolytes 114, 116 are non-miscible, the organic electrolyte 116 is in contact only with a single one of the two electrodes 108, and the dielectric material 106, by its thickness, prevents the organic electrolyte 116 from bypassing the first electrode 104. Thus, the thicknesses of the electrodes 104, 108 and that of the dielectric material 106 are chosen so that there is no bypassing by the electrolytes 114 and 116 in the photovoltaic cell 100.

The organic electrolyte 116 is in this case apolar, i.e. it is formed by apolar compounds not comprising positive or negative electric charges, or has low polarity, i.e. it is composed of a solvent of which the eluting power is, for example, between around 0.01 and 0.5. The organic electrolyte 116 is therefore hydrophobic in this case. By comparison with the organic electrolyte 116, the aqueous electrolyte 114 is polar and therefore hydrophilic.

The light rays, which enter through the first substrate 102 and/or the second substrate 110, induce a photocurrent between the two electrodes 104 and 108.

This photocurrent is obtained by a transfer of heterogeneous electrons, i.e. a transfer of electrons between two non-miscible phases, at the level of the liquid-liquid interface formed by the two electrolytes 114 and 116, between one of the two electrolytes, containing electron acceptor or donor photosensitive molecules, and the other of the two electrolytes, containing electron donor or acceptor redox couples respectively. The electron donor or acceptor nature of the redox couples and the photosensitive molecules is determined on the basis of the ratio between the redox potential of the redox couples and the energy levels of the photosensitive molecules. In the case of an electron acceptor redox couple, we have, for example, $E_{NHE}TCNQ/TCNQ^- = 0.05$ V, and in the case of an electron donor redox couple, we have for example $E_{NHE}DFCET^+/DFCET = 0.31$ V in the presence of $ZnTPPC^{4-}$ molecules.

In the case of an aqueous electrolyte 114 comprising electron donor hydrophilic photosensitive molecules and an organic electrolyte 116 comprising electron acceptor hydrophobic redox couples, the photons received by the cell 100 initiate a transfer of electrons from the photosensitive molecules to the redox couples. The electrons are then collected at the level of the second electrode 108, thus creating a current between the first and second electrodes 104 and 108. This photocurrent is inverted when the aqueous electrolyte 114 comprises electron acceptor photosensitive molecules and when the organic electrolyte 116 comprises electron donor redox couples.

The photosensitive compounds present in the aqueous electrolyte 114 can be, for example, based on:
  zinc tetrakis(carboxyphenyl)porphyrin ZnTPPC,
  cationic Ni-5,10,15,20-tetrakis(4-N-methylapyridiniumyl)porphyrin (Ni(TMpy-P4)),
  copper (II) tetrakis (p-sulfonatophenyl)deporphyrin ($Cu^{II}$, TSPP) and copper(II) tetrakis(4-N-methylpyridyl)porphyrin ($Cu^{II}$(TMpy-P4)),
  any other photosensitive molecules soluble in an aqueous solution.

The organic solution 116 can comprise at least one of the following compounds:
  1,2-dichloroethane (DCE),
  acetonitrile,
  toluene,
  hexane.

In this case, the above compounds are mixed with a solute such as, for example bis(triphenylphosphanylidene)ammonium tetrakis(4-chlorophenyl)borate, or BTPPATPBCI.

Finally, the following redox couples can, for example, be used in the organic electrolyte 116 and act as an electron donor or acceptor:
  TCNQ=7,7', 8,8'-tetra-cyano-quino-dimethane (electron acceptor),
  DFCET=1,2-diferrocenylethane (electron donor),
  any polymetallocene macrocycle including rings alternately constituted by aromatic and alkylene chains. These rings induce transitions in metal complexes or metalocenyl groupings. These are hydrophobic redox molecules that can act as intermediate molecules in the electron transfer or as redox catalysts.

In an alternative, it is possible for the aqueous electrolyte 114 to comprise electron donor or acceptor hydrophilic redox couples, and for the organic electrolyte 116 to comprise electron acceptor or donor photosensitive molecules respectively. In this case, the photons received in the cell 100 initiate a transfer of electrons from the organic solution 116 to the aqueous solution 114. The electrons are then collected at the level of the first electrode 104.

The difference in potential created between the two electrodes 104, 108 modifies the radius of curvature of the liquid-liquid interface formed by the two electrolytes 114 and 116. Thus, the electrodes 104, 108 as well as the dielectric material 106 must be sized, at the level of their thickness, so that this modification of the radius of curvature does not lead to a bypass between the two electrodes 104, 108.

A photovoltaic cell 100 as described above, comprising an active surface (electrolyte surface exposed to light radiation) for example equal to around 1.54 $cm^2$ makes it possible to produce a photo-induced current equal to around 10 $\mu A/cm^2$.

In an alternative of the first embodiment described, the first and/or second electrode 104, 108 can be partially coated with a dielectric layer, formed, for example, by deposition or by surface treatment. Hydrophobic and/or hydrophilic treatments can also be performed on the various elements of the cell 100, i.e. the substrates 102, 110 and/or the electrodes 104, 108 and/or the dielectric material portion 106.

In another alternative, the aqueous electrolyte 114 and/or the organic electrolyte 116 can each be a polar or apolar ionic liquid. For example, the electrolyte 114 can be a hydrophilic ionic liquid, for example 1-butyl-1-methylpyrrolidinium bis trifluoro-methylsulfonyl)amide ([MBP] Tf2N). The electrolyte 116 can be, for example, a hydrophobic ionic liquid allowing for good charge transport, such as:

an ionic liquid based on hydrophobic anions such as trifluoromethanesulfonate ($CF_3SO_3^-$), bis-(trifluoromethanesulfonyl)imide [$(CF_3SO_2)_2N^-$] and tris-(trifluoromethanesulfonyl)methide [$(CF_3SO_2)_3C^-$], $ZnCl_2$/[EMIm] Cl, [EMIm] $BF_4$, [BMIm] $BF_4$, [BMIm] $PF_6$, [BMP] $Tf_2N$, [BMIm] $Tf_2N$ and choline chloride-MCl, ionic liquid [bm/m] $^+I^-$.

The use of ionic liquids makes it possible in this case to increase the range of possible operating temperatures of the cell. Thus, a photovoltaic cell with ionic liquids can work at temperatures between around 0° C. and 200° C.

In the case of electrolytic solutions 114 and 116 based on ionic liquids, the redox couple $I^-/I^{3-}$ can be used in one or the other of the electrolytes.

Figure 2:
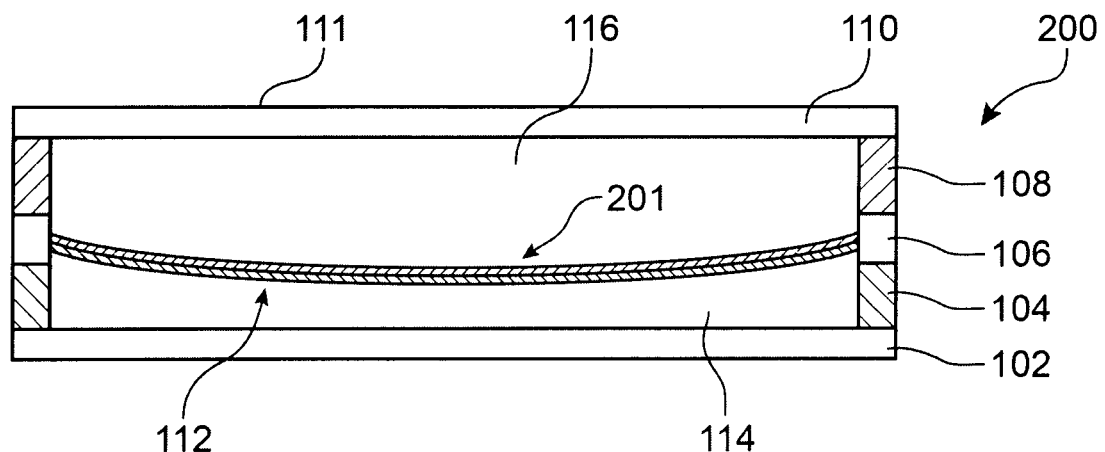
FIG. 2 is a cross-section view of a photovoltaic cell with non-miscible electrolytes according to a second embodiment.

FIG. 2 shows a cross-section view of a photovoltaic cell with non-miscible electrolytes 200 according to a second embodiment.

By comparison with the photovoltaic cell 100 according to the first embodiment, the second electrode 108 in this case has a rectangular profile. However, this electrode can also have a trapezoidal profile. In addition, the photovoltaic cell 200 comprises a photoactive layer 201 deposited at the interface between the two electrolytes 114, 116, produced, for example, by electrochemical deposition, polarizing the two electrodes 104 and 108 of the cell 200. This electrolytic deposition is performed by means of precursors contained in one of the two electrolytes, by applying a difference in potential between the electrodes 104 and 108.

This photoactive layer 201 can, for example, be either a heterojunction of the electron donor polymer semiconductor/electron acceptor semiconductor type, or based on at least one semiconductor with photovoltaic properties (for example, based on Si, and/or Ge, and/or GaAs, and/or ZnTe, and/or ZnO), for example two layers with different dopings forming a homojunction. In the case of a homojunction, precursors are added by injection during the electrolytic deposition in order to change the doping of the electrolytically deposited material.

The invention claimed is:

1. A photovoltaic cell comprising at least:
a closed chamber including two end walls arranged opposite one another, with at least one being intended to receive incident light radiation, and including at least one side wall formed by at least one stack of a first electrode and a second electrode electrically insulated from one another, the first electrode and second electrode each having an annular shape, and each being limited to a periphery of a respective one of the two end walls;
at least two non-miscible electrolytes placed in the closed chamber, forming two superimposed layers of which one is in contact with the first electrode and the other is in contact with the second electrode; and
means, placed in the closed chamber, for achieving a photovoltaic conversion of energy of the incident light radiation.

2. The photovoltaic cell according to claim 1, wherein the photovoltaic cell has a substantially cylindrical or prismatic shape, and the at least one side wall respectively has a substantially annular shape.

3. The photovoltaic cell according to claim 1, wherein the photovoltaic cell also comprises a first substrate arranged against the first electrode and forming one of the two end walls of the closed chamber and/or a second substrate arranged on the second electrode forming the other of the two end walls of the closed chamber.

4. The photovoltaic cell according to claim 3, wherein the first substrate and/or the second substrate is/are based on glass and/or polymer.

5. The photovoltaic cell according to claim 1, in which one of the two electrolytes is aqueous and the other of the two electrolytes is organic.

6. The photovoltaic cell according to claim 1, wherein one of the two electrolytes is polar and the other of the two electrolytes is apolar.

7. The photovoltaic cell according to claim 1, wherein at least one of the two electrolytes is based on an ionic liquid.

8. The photovoltaic cell according to claim 1, wherein the means for achieving the photovoltaic conversion comprises at least electron acceptor or donor redox couples, and electron donor or acceptor photosensitive molecules respectively, in which the redox couples are arranged in one of the two electrolytes, and the photosensitive molecules are arranged in the other of the two electrolytes.

9. The photovoltaic cell according to claim 1, wherein the means for achieving the photovoltaic conversion comprises at least one photoactive layer deposited at an interface between the two electrolytes.

10. The photovoltaic cell according to claim 9, wherein the photoactive layer comprises a heterojunction based on at least one polymer electron donor semiconductor and at least one electron acceptor semiconductor.

11. The photovoltaic cell according to claim 9, wherein the photoactive layer comprises a junction formed by at least two layers, based on at least one semiconductor, with a different doping.

12. The photovoltaic cell according to claim 1, wherein the first electrode and/or the second electrode is partially coated with at least one dielectric material.

13. The photovoltaic cell according to claim 3, wherein the first substrate and/or the second substrate is based on at least one hydrophobic or hydrophilic material.

14. The photovoltaic cell according to claim 3, wherein the first substrate and/or the second substrate comprises a hydrophobic or hydrophilic surface treatment.

15. The photovoltaic cell according to claim 1, wherein the first electrode and/or the second electrode is based on at least one hydrophobic or hydrophilic material.

16. The photovoltaic cell according to claim 1, wherein the first electrode and/or the second electrode comprises a hydrophobic or hydrophilic surface treatment.

17. A photovoltaic cell comprising at least:
a closed chamber including two end walls arranged opposite one another, with at least one being intended to receive incident light radiation, and including at least one side wall formed by at least one stack of a first electrode and a second electrode electrically insulated from one another, the first electrode and second electrode each having an annular shape, and each being limited to a periphery of a respective one of the two end walls;
at least two non-miscible electrolytes placed in the closed chamber, forming two superimposed layers of which one is in contact with the first electrode and the other is in contact with the second electrode; and
a photoactive layer, placed in the closed chamber, that achieves a photovoltaic conversion of energy of the incident light radiation.

* * * * *